United States Patent [19]

Ichikawa

[11] Patent Number: 4,759,079

[45] Date of Patent: Jul. 19, 1988

[54] RANDOM NOISE DETECTING SYSTEM AND METHOD

[75] Inventor: Toshihito Ichikawa, Saitama, Japan

[73] Assignee: Pioneer Electronic Corporation, Tokyo, Japan

[21] Appl. No.: 686,799

[22] Filed: Dec. 27, 1984

[30] Foreign Application Priority Data

Dec. 27, 1983 [JP] Japan ............................... 58-244773

[51] Int. Cl.[4] ............................................... H04B 1/06

[52] U.S. Cl. .................................... 455/202; 455/203; 455/260; 455/265; 375/120; 375/77

[58] Field of Search ............... 455/202, 203, 260, 265; 375/119, 120, 77; 358/195.1; 329/50, 124

[56] References Cited

U.S. PATENT DOCUMENTS

| | | | |
|---|---|---|---|
| 2,268,998 | 1/1942 | Bay | 455/305 |
| 3,939,424 | 2/1976 | Shimizu et al. | 455/265 |
| 3,939,425 | 2/1976 | Toyoshima | 329/124 |
| 3,949,309 | 4/1976 | Pecar | 455/305 |
| 4,091,410 | 5/1978 | Citta | 358/195.1 |
| 4,322,751 | 3/1982 | Hongu et al. | 455/265 |

*Primary Examiner*—Robert L. Griffin
*Assistant Examiner*—Elissa Seidenglanz
*Attorney, Agent, or Firm*—Sughrue, Mion, Zinn, Macpeak, and Seas

[57] ABSTRACT

A system and method for detecting the level of random noise contained in a band-limited amplitude-modulated signal. A sychronizing signal is produced which is $\pi/2$ out of phase with respect to the carrier of the amplitude-modulated signal. The amplitude-modulated signal and the synchronizing signal are multiplied together. Only a low frequency component is extracted from the multiplication output, and the low frequency component is taken as an indication of the level of the random noise contained in the amplitude-modulated signal.

6 Claims, 2 Drawing Sheets

BAND LIMITING FILTER (3)
MULTIPLIER (4)
LOW-PASS FILTER (5)
PHASE COMPARATOR (7)
VCO (8)
LOW-PASS FILTER (9)
SYNC. SIGNAL GEN. (10)

RANDOM NOISE DETECTING SYSTEM AND METHOD

BACKGROUND OF THE INVENTION

The present invention relates to a random noise detecting system and method for a double sideband (DSB) amplitude modulation communication system.

In a conventional random noise detecting system as shown in FIG. 1, a high-pass filter 2 is used to detect a high frequency component (including no modulating signal component) in the detection output of an amplitude modulation detector circuit 1, thereby to detect the amount of noise present in the signal.

With this method, in a case such as in a tuner where band limitation is effected, it is difficult to completely separate the modulating signal and the noise from the AM detection output. In order to sufficiently separate the noise, it is necessary to increase the bandwidth. However, increasing the bandwidth lowers the performance of the tuner.

SUMMARY OF THE INVENTION

Accordingly, an object of the present invention is to provide a random noise detecting system and method in which the above-described difficulties and problems accompanying a conventional random noise detecting system and method have been eliminated, and the random noise can be can be detected irrespective of band limitation and the presence of the modulating signal.

The above and other objects of the invention are met by a random noise detecting system and method for detecting a level of random noise contained in an amplitude-modulated signal which is band limited and which contains random noise. A synchronizing signal is produced with is $\pi/2$ out of phase with a carrier of the amplitude-modulated signal. The amplitude-modulated signal and the synchronizing signal are multiplied together to provide a multiplication output. Only a low frequency component is extracted from the multiplication output, the low-frequency component being taken as an indication of the random noise level.

DESCRIPTION OF THE PREFERRED EMBODIMENTS

The invention will now be described with reference to preferred embodiments.

Figure 1:
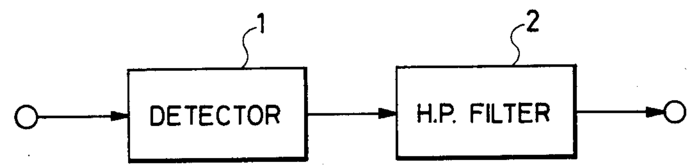
FIG. 1 is a block diagram showing a conventional random noise detecting system.
Figure 2:
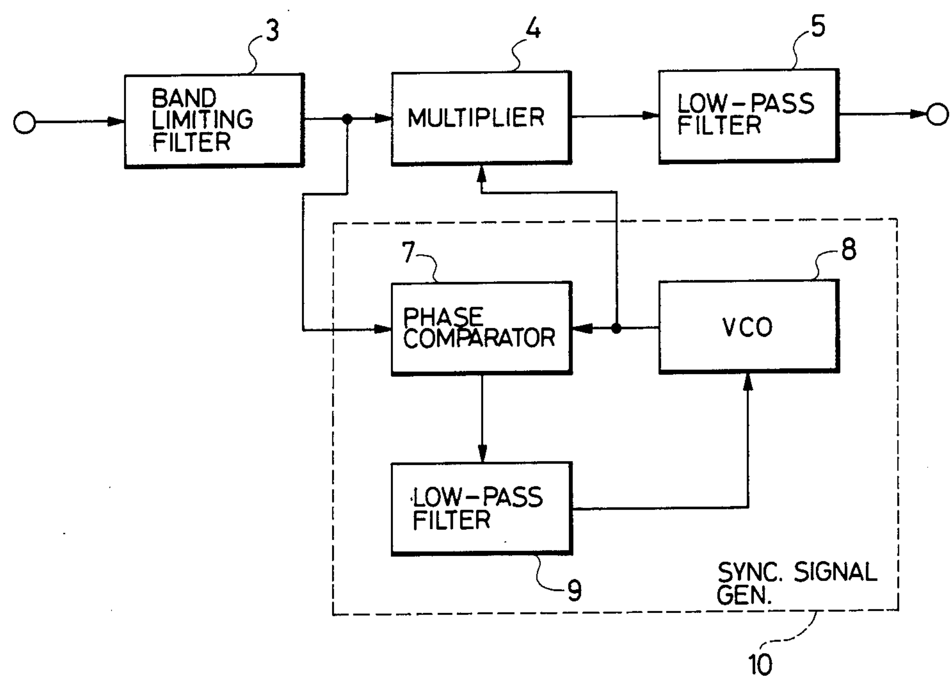
FIG. 2 is a block diagram showing a noise detecting system operating in accordance with the invention.

FIG. 2 is a block diagram showing illustrating a random noise detecting system which operates in accordance with a preferred embodiment of the invention.

In FIG. 2, reference numeral 3 designates a band limiting (bandpass) filter. An amplitude-modulated signal is applied to the band limiting filter 3 where it is subjected to band limitation. The output of the band limiting filter 3 is supplied to a multiplier 4, the output of which is applied to a synchronizing signal generating circuit 10, which is a PLL circuit composed of a phase comparator 7, a voltage-controlled oscillator 8 and a low-pass filter 9. In the circuit 10, a square wave signal synchronous with the carrier wave is formed. The square wave signal thus formed is applied to the multiplier 4 where it is multiplied by the output of the band limiting filter 3.

The operation of the random noise detecting system will be described.

It is assumed that an amplitude-modulated signal S(t) applied to the band limiting filter 3 is represented by:

$$S(t)=A_c(1+k\cdot\cos\omega_p t)\cdot\cos\omega_c t, \tag{1}$$

where $A_c$ is a constant, k is a modulation factor, $\omega_p$ is the modulation angular frequency, and $\omega_c$ is the carrier angular frequency.

If the main noise source generates white Gaussian noise, then the noise n(t) can be represented by the following expression:

$$n(t) = \sum_{n=0}^{N} (a_n \cdot \cos\omega nt + b_n \cdot \sin\omega nt), \tag{2}$$

where $\omega n=2\pi n/T$, and T is a relatively long time period.

If the noise is expressed in the form of a Fourier series, the coefficients $a_n$ and $b_n$ are random variables which are independent of each other, have an average value of 0, and conform to the regular distribution of variance $\delta^2$.

Since $\cos\omega nt=\cos(\omega n-\omega_c+\omega_c)t$, with $\omega n-\omega_c=\omega m$, expression (2) can be rewritten as follows:

$$n(t) = \sum_{m=-M}^{M} [a_m \cdot \cos(\omega_c+\omega m)t + b_m \cdot \sin(\omega_c+\omega m)t]. \tag{3}$$

For ωm, frequencies up to a frequency half the band limiting width of the band limiting filter 3 should be taken into consideration. Therefore, the composite of the signal S(t) and the noise n(t) is as follows:

$$S(t)+n(t) = A_c\cdot(1+k\cdot\cos\omega_p t)\cdot\cos\omega_c t + \sum_m [a_m\cdot\cos(\omega_c+\omega m)t + b_m\cdot\sin(\omega_c+\omega m)t] = \left[A_c + A_c\cdot k\cdot\cos\omega_p t + \sum_m (a_m\cdot\cos\omega mt + b_m\cdot\sin\omega mt)\right]\cdot \cos\omega_c t + \left[\sum_m (b_m\cdot\cos\omega mt - a_m\cdot\sin\omega mt)\right]\sin\omega_c t. \tag{4}$$

This signal represented by expression (4) is applied to the multiplier 4, while sin $\omega_c$t is supplied to the multiplier 4 by the synchronizing signal generating circuit 10 so that these signals are subjected to multiplication by the multiplier 4. The output of the multiplier 4 is as follows:

$$[S(t)+n(t)]\cdot\sin\omega_c t = \left[A_c + A_c\cdot k\cdot\cos\omega_p t + \sum_m (a_m\cdot\cos\omega mt + b_m\cdot\sin\omega mt)\right]\cdot \frac{1}{2}\cdot\sin 2\omega_c t + \tag{5}$$

-continued $$\left[ \sum_m (b_m \cdot \cos \omega mt - a_m \cdot \sin \omega mt) \right] \frac{1 - \cos 2\omega_c t}{2} .$$

The output of the multiplier 4 is applied to the low-pass filter 5. The responsive output of the low-pass filter 5 is as follows:

$$U_m(t) = \frac{1}{2} \left[ \sum_m (b_m \cdot \cos \omega mt - a_m \cdot \sin \omega mt) \right]. \quad (6)$$

In other words, the low frequency component which is extracted by the low-pass filter 5 is at a frequency which is below twice the frequency of the carrier of the amplitude-modulated signal applied at the input of the low-pass filter 5. Expression (6) can be rewritten as follows:

$$U_m(t) = \frac{1}{2} \left[ \sum_{m=-M}^{m} (b_m \cdot \cos \omega mt - a_m \cdot \sin \omega mt) \right] = \quad (7)$$

$$\frac{1}{2} \left[ \sum_{m=0}^{m} ((b_m + b - m) \cdot \cos \omega mt + (a - m - a_m) \sin \omega mt) \right] =$$

$$\frac{1}{2} \left[ \sum_{m=0}^{m} (B_m \cdot \cos \omega mt + A_m \cdot \sin \omega nt) \right],$$

$$\text{where, } \overline{A_m} = \overline{a - m} - \overline{a_m} = 0 \quad (8)$$

$$\overline{B_m} = \overline{b_m} + \overline{b - m} = 0$$

$$\overline{A_m^2} = \overline{(a - m - a_m)^2} = \overline{a - m^2} + \overline{a_m^2} = 2\,\delta^2$$

$$\overline{B_m^2} = \overline{(b_m + b - m)^2} = \overline{b_m^2} + \overline{b - m^2} = 2\,\delta^2$$

According to expression (8), $A_m$ and $B_m$ are distributed regularly, and therefore expression (7) also provides an indication of the white Gaussian noise present.

It can be understood that the power of the noise component of expression (3) is in proportion to the power of the noise component in expression (7), which is detected at the output of the low-pass filter.

Accordingly, the signal's noise level can be obtained from the output of the low-pass filter 5 irrespective of the modulation signal and the band limitation.

The output of the voltage-controlled oscillator 8 is supplied to the multiplier 4. The output of the band limiting filter 3 and the output of the voltage-controlled oscillator 8 are subjected to phase comparison by the phase comparator 7, and the phase-difference output thereof is applied to the low-pass filter 9, the output of which is applied as a control voltage to the voltage-controlled oscillator 8. A signal synchronous with the carrier is obtained at the output of voltage-controlled oscillator 8. Due to the operation of the analog PLL circuit, the output of the voltage-controlled oscillator 8 is synchronous with the input signal with a phase shift of $\pi/2$. Thus it can be seen that the calculation of expression (6) is carried out by the multiplier 4.

A specific example of the circuit construction of the multiplier 4 will be described with reference to FIG. 3.

Figure 3:
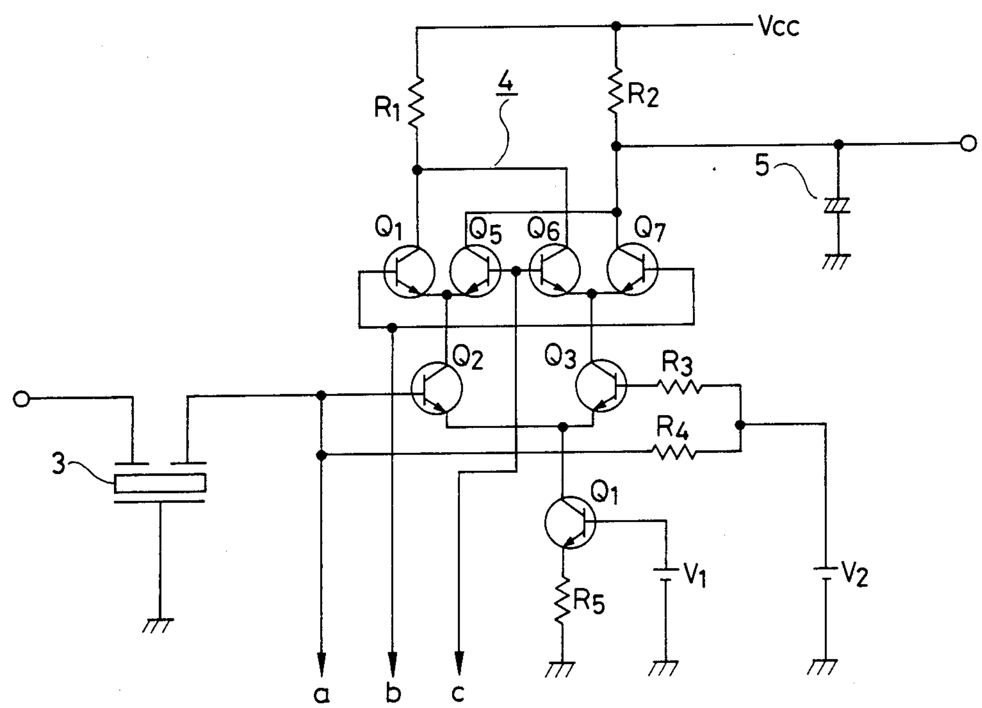
FIG. 3 is a circuit diagram showing a specific example of a multiplier used in the system of FIG. 2.

In FIG. 3, CF-1 (crystal filter-1) is the band limiting filter 3. Transistors $Q_1$ through $Q_4$ and resistors $R_1$ through $R_5$ form the multiplier 4, which is of the double-balanced circuit type. The output of the multiplier 4 is provided at the resistor $R_2$. The resistor $R_2$ and a capacitor $C_1$ form the low-pass filter 5. A terminal a is connected to the phase comparator 7, and terminals b and c are connected to the voltage-controlled oscillator 8. The circuit in FIG. 3 and the PLL circuit perform the operations described with reference to a preferred embodiment of the invention, thus detecting the random noise.

In the above-described embodiment, the synchronizing signal generating circuit 10 is implemented with a PLL circuit. However, the synchronizing signal may be obtained by a method in which the input signal is applied to a bandpass filter whose pass band is extremely narrow to obtain the carrier, and the carrier thus obtained is subjected to phase shifting by a 90° phase shifter to obtain the synchronizing signal.

In the above-described embodiment, the carrier is available. However, the technical concept of the invention is applicable to the case of a DSB signal having a suppressed carrier. In this case, the carrier can be formed by using, for instance, a Costas-loop (I-Q Loop) PLL circuit as the synchronizing signal generating circuit.

As is apparent from the above description, according to the invention, only the random noise in an input signal can be detected irrespective of band limitation and modulation signal components.

I claim:

1. A random noise detecting method for detecting a random noise level in an amplitude-modulated signal which is band limited and which contains random noise, comprising the steps of: producing a synchronizing signal $\pi/2$ out of phase with a carrier of said amplitude-modulated signal; multiplying said amplitude-modulated signal and said synchronizing signal to provide a multiplication output; and extracting only a low frequency component from said multiplication output, said low frequency component being below twice a frequency of said carrier of said amplitude-modulated signal, and said low frequency component being indicative of said ramdom noise level.

2. The random noise detecting method of claim 1, wherein said step of producing said synchronizing signal comprises applying said amplitude-modulated signal to a bandpass filter whose passband is extremely narrow, and subjecting the signal thus obtained by 90° to thereby produce said synchronizing signal.

3. The random noise detecting method of claim 1, for the case of a double-sideband suppressed carrier signal, further comprising the step of producing said carrier by passing said amplitude-modulated signal through a Costas-loop phase-locked loop circuit.

4. The random noise detecting method of claim 1, wherein said step of producing said synchronizing signal comprises passing said amplitude-modulated signal through a phase-locked loop circuit.

5. A random noise detecting system for detecting a random noise level in an amplitude-modulated signal which is band limited and which contains random noise, comprising: means for producing a synchronizing signal $\pi/2$ out of phase with a carrier of the amplitude-modulated signal; means for multiplying the amplitude-modulated signal and the synchronizing signal to provide a multiplication output; and means for extracting only a low frequency component from said multiplication output, said low frequency component being below twice a frequency of said carrier of said amplitude-modulated signal, and said low frequency component being indicative of said random noise level.

6. The random noise detecting system of claim 5, wherein said means for producing said synchronizing signal comprises a phase-locked loop.

* * * * *